(12) United States Patent
Markusch et al.

(10) Patent No.: US 6,706,776 B2
(45) Date of Patent: Mar. 16, 2004

(54) SYNTACTIC FOAMS WITH IMPROVED WATER RESISTANCE, LONG POT LIFE AND SHORT DEMOLDING TIMES

(75) Inventors: Peter H. Markusch, Sanibel, FL (US); Ralf Guether, Pittsburgh, PA (US); Tom L. Sekelik, Carnegie, PA (US)

(73) Assignee: Bayer Corporation, Pittsburgh, PA (US)

( * ) Notice: Subject to any disclaimer, the term of this patent is extended or adjusted under 35 U.S.C. 154(b) by 60 days.

(21) Appl. No.: 10/174,224

(22) Filed: Jun. 18, 2002

(65) Prior Publication Data

US 2003/0232899 A1 Dec. 18, 2003

(51) Int. Cl.$^7$ .................................................. C08J 9/34
(52) U.S. Cl. .................... 521/170; 138/118.1; 138/141; 138/145; 428/425.8; 521/54; 521/99; 521/124; 521/126; 521/127; 521/137; 521/174; 523/218; 523/219
(58) Field of Search .......................... 521/54, 99, 124, 521/126, 127, 137, 170, 174; 523/218, 219; 428/425.8; 138/118.1, 141, 145

(56) References Cited

U.S. PATENT DOCUMENTS

| | | | |
|---|---|---|---|
| 3,510,392 A | 5/1970 | D'Eustachio et al. | |
| 4,038,238 A | 7/1977 | Cravens | |
| 4,082,702 A | 4/1978 | Harper | |
| 4,303,729 A | 12/1981 | Torobin | 428/327 |
| 4,303,736 A | 12/1981 | Torobin | 428/403 |
| 4,829,094 A | 5/1989 | Melber et al. | 521/57 |
| 4,843,104 A | 6/1989 | Melber et al. | 521/54 |
| 4,902,722 A | 2/1990 | Melber | 521/54 |
| 4,916,173 A | 4/1990 | Otloski et al. | 523/219 |
| 4,959,395 A | 9/1990 | Janda | 521/54 |
| 5,491,252 A * | 2/1996 | Narayan et al. | 560/26 |
| 5,684,057 A * | 11/1997 | White et al. | 521/167 |
| 6,166,109 A | 12/2000 | Spitler et al. | 523/218 |
| 6,284,809 B1 * | 9/2001 | Plummer et al. | 521/54 |
| 6,284,812 B1 * | 9/2001 | Rotermund et al. | 521/174 |

FOREIGN PATENT DOCUMENTS

| | | |
|---|---|---|
| JP | 4-257429 | 9/1992 |
| WO | 96/28684 | 9/1996 |

* cited by examiner

*Primary Examiner*—John Cooney
(74) *Attorney, Agent, or Firm*—Joseph C. Gil; N. Denise Brown

(57) ABSTRACT

This invention relates to syntactic foams comprising the reaction product of a liquid diphenylmethane diisocyanate component, with an isocyanate-reactive component, a filler having a density of less than 1 g/cm 3, and at least one organo-metallic catalyst. This invention also relates to the use of these syntactic foams for insulating pipes.

18 Claims, No Drawings

SYNTACTIC FOAMS WITH IMPROVED WATER RESISTANCE, LONG POT LIFE AND SHORT DEMOLDING TIMES

BACKGROUND OF THE INVENTION

This invention relates to syntactic foams, a process for the preparation of these syntactic foams, pipes insulated with these syntactic foams, and a process for the production of these pipes insulated with syntactic foams.

Rigid foams and processes for their production are well known in the art. Such foams are typically produced by reacting a polyisocyanate with an isocyanate reactive material such as polyol in the presence of a blowing agent. A lot of the blowing agents used in the past are no longer acceptable, and the ones developed in recent years are available at much higher costs. Furthermore, the state of the art rigid foams prepared with blowing agents do not exhibit the high compression set required when foams are used, i.e. in applications like deep sea pipeline insulation.

In recent years, the substantial increases in costs of the basic materials used to make foam, has encouraged the development and use of filler materials to reduce the amount of the basic materials used and the weight of the finished materials. One of the suggested filler materials and insulating materials utilizes hollow microspheres.

The expression "syntactic" as used herein refers to the use of hollow spheres in a polymer matrix to produce a cellular material.

Expanded microspheres consisting of a synthetic thermoplastic resin shell that encapsulates a liquid blowing agent are known. See, for example, U.S. Pat. Nos. 4,829,094, 4,843,104 and 4,902,722. U.S. Pat. Nos. 4,829,094 and 4,843,104 disclose a syntactic-polymer foam composition having a low density filler containing free flowing microspheres.

U.S. Pat. No. 4,916,173 discloses a polyurethane syntactic foam compositions for millable modeling stock applications. These PU syntactic foam compositions have high glass transition temperatures and low coefficients of thermal expansion, and are prepared from a polymeric isocyanate, an amine-based polyol, a polyether triol, molecular sieve material and hollow microspheres. The foams are described as a solid polymer matrix. These compositions are based on polymethylene poly(phenyl isocyanate) and result in low physical properties (i.e. tensile strength, elongation, etc.) which may be suitable for modeling stock applications, but not for the more demanding requirements in deep sea pipeline insulation A solid polymer matrix is disclosed by U.S. Pat. No. 4,959,395. This patent describes bulk polymerization of cycloolefin monomers by ring-opening polymerization wherein the microencapsulated blowing agents aid in filling molds during RIM procedures such that both surfaces of the article being molded remain in contact with the mold surfaces.

U.S. Pat. Nos. 4,303,729 and 4,303,736 disclose the use of hollow plastic microspheres as filler materials in plastics. The microspheres described by these two are generally large diameter microspheres, i.e. in the range of 200 to 10,000 microns. These microspheres can be made from low heat conductivity plastic compositions and blown with a low heat conductivity gas to make improved insulation materials and composites.

Hollow microspheres having lower loadings of 2 to 5% by weight of the total composition are disclosed by U.S. Pat. No. 4,038,238. Low density polyurethanes are produced from rapid-setting polyurethane-forming compositions containing light weight hollow spheres or microballoons and a liquid viscosity reducing agent.

A rigid syntactic foam comprising glass microballoons is disclosed by U.S. Pat. No. 4,082,702. These foams are obtained by mixing an organic polyol, a polyisocyanate, a catalyst for the reaction of the polyol and the polyisocyanate, microballoons, and a flame retardant foam having a bimodal cell structure.

U.S. Pat. No. 3,510,392 discloses glass nodules in cellular polyurethane. The polyurethane comprises a polyol and/or polyester reacted with an polyisocyanate, and water during crosslinking to provide a gaseous blowing agent. The reactive components are homogeneously mixed in a suitable mixing device with a surfactant and catalyst to control the rate of reaction. Cellulate glass nodules are added to the homogeneous mixture in the bottom of a mold cavity which is then closed and foaming occurs. These are suitable for building panels having a continuous polyurethane phase and a discontinuous phase (i.e. cellular glass nodules).

Syntactic rigid PUR/PIR foam boardstock is described by U.S. Pat. No. 6,166,109. These hollow microspheres are filled with a hydrocarbon, air or vacuum, to introduce uniform cell geometries in the foams. The microspheres, which have an average diameter of 0.01 to 60 microns, are encapsulated with a closed cell polyurethane foam. Foams in the examples are based on a polyester, a surfactant, catalysts, water, a chlorofluorocarbon blowing agent and a polymethylene poly(phenylisocyanate). These syntactic rigid foams have a bimodal cell structure.

The JP 4257429 reference describes the manufacture of foam sheets with smooth surfaces which are useful for thermal insulators, packaging materials, etc. The foam sheets of this reference can be prepared by applying a composition containing an organic polymer binder and a low boiling point solvent sealed thermally expandable microcapsules on a base film, laminating a polyester film on the coated layer, heating to dry and expand the coated layer and removing the polyester film. The resultant foam sheets have uniform closed cells and a smooth surface.

Thermally insulating syntactic foam compositions are disclosed by U.S. Pat. No. 6,284,809. These foam compositions have thermal conductivities less than 0.120 watts/meter-° K and exhibit acceptable strength and buoyancy characteristics for subsea applications at depths of up to about 10,000 ft. These syntactic foams are formed from 40–45 volume % of a resin binder containing hollow microspheres which comprise between about 55 and about 60 volume % microspheres and between about 65 and 50 volume % minispheres. Microspheres are described as having a diameter between 1 and 100 microns, and minispheres are defined as having diameters from ⅛ inch up to ⅜ inch.

It has now been found that a syntactic foam can be prepared having long potlife (i.e. 4 minutes) and short demolding times (i.e. less than 10 minutes), excellent hydrolytic stability combined with low water absorption and very good physical properties, i.e. high elongation combined with high tensile strength at microsphere filler levels of 10–70%. The syntactic foams of the present invention require a polyurethane composition comprising (1) a liquid diphenylmethane diisocyanate, (2) an isocyanate-reactive compound comprising a blend of one or more low unsaturation difunctional polyoxypropylene polyethers, one or more polyoxypropylene polyethers wherein the starter comprises at least one nitrogen atom, and one or more polyoxypropylene polyethers wherein the starter comprises an organic compound having at least three hydroxyl groups, and, optionally, one or more low molecular weight diols and/or triols, (3) a filler having a density of less than 1 g/cm$^3$, and (4) at least one organo-metallic catalyst.

SUMMARY OF THE INVENTION

This invention relates to syntactic foams, to a process for the preparation of these syntactic foams, to pipes insulated with these syntactic foams, and to a process for the production of pipes insulated with these syntactic foams.

Syntactic foams of the present invention comprise the reaction product of:

(1) a liquid diphenylmethane diisocyanate having an NCO group content of from about 10 to about 33.6%, preferably 15 to 32% and most preferably 20 to 30%, and a viscosity from about 10 to about 5,000 mPa·s at 25° C., preferably 10 to 3,000, and most preferably 10 to 1,000 mPa·s at 25° C.; with (2) an isocyanate-reactive component comprising:
   (a) at least 10% by weight (preferably from 10 to 30% and most preferably from 10 to 20%) by weight of one or more polyether polyols having a functionality of about 2 to about 4, preferably about 3, a (number average) molecular weight of 200 to about 8,000, preferably between 240 and 4,000 and most preferably about 450 to 500, and a hydroxyl number of 14 to 1,120, preferably of about 42 to about 700, and most preferably about 336 to 374, wherein the starter for said polyether polyol contains at least one amine group and said starter is alkoxylated with 100% by weight of propylene oxide;
   (b) at least 20% (preferably 30 to 80% and most preferably 40 to 60%) by weight of one or more low unsaturation (preferably having less than 0.01 meq/g unsaturation) polyether polyols having an OH functionality of about 2, a molecular weight of about 250 to about 8,000, preferably from about 500 to about 3,000 and most preferably about 1,000 to 2,000, and a hydroxyl number of about 14 to about 448, preferably about 37 to about 224 and most preferably about 56 to about 112, wherein the starter comprises water or an organic compound with two hydroxyl groups and said starter is alkoxylated with 100% by weight of propylene oxide;
   (c) at least 20% (preferably 30 to 80% and most preferably 40 to 60%) by weight of one or more polyether polyols having an OH functionality of about 3 to 6 (preferably 3 to 4) and a molecular weight of about 400 to 3,000 (preferably of about 500 and 1,000 and most preferably of about 600 to about 800) and a hydroxyl number of about 56 to about 840 (preferably about 168 to 448, and most preferably 210 to 373), wherein the starter comprises an organic compound with at least three hydroxyl groups and that is free of amine groups, and the starter is alkoxylated with 100% by weight of propylene oxide; and, optionally,
   (d) up to 10% by weight of one or more low molecular weight diols and/or triols having an equivalent weight of from 31 to 99, wherein the %'s by weight of (2)(a), (2)(b), (2)(c) and (2)(d) totals 100% by weight of component (2);

(3) from 10 to 70% (preferably from 15 to 30%) by weight, based on the combined weight of components (1), (2) and (3), of a filler having a density of less than 1 g/cm$^3$ (preferably glass hollow spheres); and (4) at least one organo-metallic catalyst in an amount of about 0.001 to about 1% by weight, based on 100% by weight of (2);

wherein the relative amounts of components (1) and (2) are such that the isocyanate index is from about 90 to about 120, preferably from about 95 to about 110.

The process of preparing the syntactic foams of the present invention comprises reacting:

(1) a liquid diphenylmethane diisocyanate having an NCO group content and a viscosity as described above; with (2) an isocyanate-reactive component comprising:
   (a) at least 10% by weight of one or more polyether polyols having a functionality, molecular weight and a hydroxyl number as described above, wherein the starter for said polyether polyol contains at least one amine group and said starter is alkoxylated with 100% by weight of propylene oxide;
   (b) at least 20% of one or more low unsaturation polyether polyols having an OH functionality, a molecular weight and a hydroxyl number as described above, wherein the starter comprises water or an organic compound having two hydroxyl groups and said starter is alkoxylated with 100% by weight of propylene oxide;
   (c) at least 20% by weight of one or more polyether polyols having an OH functionality, a molecular weight and a hydroxyl number as described above, wherein the starter comprises an organic compound with at least three hydroxyl groups and that is free of amine groups, and said starter is alkoxylated with 100% by weight of propylene oxide; and, optionally,
   (d) up to 10% by weight of one or more low molecular weight diols and/or triols as described above, wherein the %'s by weight of (2)(a), (2)(b), (2)(c) and (2)(d) totals 100% by weight of component (2);

(3) from 10 to 70% by weight, based on the combined weight of components (1), (2) and (3), of a filler having a density of less than 1 g/cm$^3$ (preferably glass hollow spheres); and (4) at least one organo-metallic catalyst in an amount of about 0.001 to about 1% by weight, based on 100% by weight of (2);

wherein the relative amounts of components (1) and (2) are such that the isocyanate index is from about 90 to about 120, preferably from about 95 to about 110.

The present invention is also directed to a pipe insulated with the syntactic foam as described hereinabove, and to a process for the production of a pipe insulated with this syntactic foam. The process for the production of a pipe insulated with the syntactic foam comprises:

(I) placing a steel pipe in the center of a cylindrical mold with the diameter of the mold being larger than the diameter of the pipe, wherein the difference in diameter between the pipe and the mold determines the thickness of the syntactic foam to be applied;

(II) pouring a liquid polyurethane reaction mixture containing a filler around the steel pipe in the mold, wherein said liquid polyurethane reaction mixture is formed by
   (A) blending (3) a filler having a density of less than 1 g/cm$^3$ (preferably glass hollow spheres) with (1) a liquid diisocyanate component and/or (2) an isocyanate-reactive component,
   (B) adding (4) an organo-metallic catalyst to the isocyanate-reactive component which may or may not contain a filler, and (C) mixing the liquid diisocyanate component with the isocyanate-reactive component, wherein:
 (1) said liquid diisocyanate component comprises liquid diphenylmethane diisocyanate having an NCO group content of from about 10 to about 33.6% and has a viscosity of from about 10 to about 5,000 mPa·s at 25° C., and
 (2) said isocyanate-reactive component comprises:
  (a) at least 10% by weight of at least one polyether polyol having a functionality of about 2 to about 4, a molecular weight of about 200 to about 8,000 and a hydroxyl number of about 14 to about 1,120, wherein the starter for said polyether polyol contains at least one amine group and is alkoxylated with 100% by weight of propylene oxide,
  (b) at least 20% by weight of one or more low unsaturation polyether polyol having an OH functionality of about 2, a molecular weight of about 250 to about 8,000, and a hydroxyl number of about 14 to about 448, wherein the starter comprises water or an organic compound with two hydroxyl groups and is alkoxylated with 100% by weight of propylene oxide,
  (c) at least 20% by weight of one or more polyether polyols having an OH functionality of about 3 to about 6, a molecular weight of about 400 to about 3,000 and a hydroxyl number of about 56 to about 840, wherein the starter comprises an organic compound with at least three hydroxyl groups and that is free of amine groups, and is alkoxylated with 100% by weight of propylene oxide, and, optionally,
  (d) up to 10% by weight of one or more low molecular weight diols and/or triols having an equivalent weight of from 31 to 99,
wherein the %'s by weight of (2)(a), (2)(b), (2)(c) and (2)(d) totals 100% by weight of component (2);
 (III) allowing the liquid polyurethane reaction mixture containing the filler to cure to form a solid polyurethane containing a filler, which encapsulates the steel pipe; and
 (IV) demolding the polyurethane encapsulated steel pipe, thereby yielding a syntactic foam insulated pipe.

DETAILED DESCRIPTION OF THE INVENTION

The syntactic foams of the present invention are hydrolytically stable and have a high compression E-modulus. More specifically, the high compression E-modulus is greater than 300 psi. These hydrolytically stable syntactic foams can be exposed to water at temperatures of from 0 to 40° C. for up to 10 years without degradation. These syntactic foams also exhibit a long pot-life, i.e. about 4 minutes, and short demolding times, i.e. less than 10 minutes. In particular, at about the same hardness and density, a liquid diphenylmethane diisocyanate vs. polymethylene poly(phenylisocyanate) in combination with a low unsaturation difunctional polyether polyol, the resultant syntactic foams have higher tensile strength and elongation (about 50% more), higher tear strength (i.e. about 3 times higher), lower Taber abrasion (30 to 50% less), and considerably lower water absorption (25 to 50% less in fresh water, and 20 to 30% less in salt water).

Suitable liquid diphenylmethane diisocyanates to be used as component (1) in the syntactic foam of the present invention have an NCO group content of from about 10 to about 33.6%, and a viscosity of about 10 to about 5,000 mPa·s at 250. It is preferred that the NCO group content be from about 15 to about 32% and a viscosity from about 10 to about 3,000 mPa·s at 25°. Most preferred are liquid diphenylmethane diisocyanates having an NCO group content of from about 20 to about 30% and a viscosity from about 10 to about 1,000 mPa·s at 25°.

The liquid diphenylmethane diisocyanates can comprise up to 70% (preferably from 1 to 55%) by weight of the 2,4'-isomer of diphenylmethane diisocyanate, no more than 2% (preferably no more than 1%) by weight of the 2,2'-isomer of diphenylmethane diisocyanate, and the balance being the 4,4'-isomer of diphenylmethane diisocyanate, with the sum of the 2,2'-isomer, the 2,4'-isomer and the 4,4'-isomer totaling 100% by weight of diphenylmethane diisocyanate. Most preferred are liquid diphenylmethane diisocyanates that contain more than 90% of the 4,4'-isomer.

Modified liquid diphenylmethane diisocyanates are also preferred isocyanates to be used in the present invention. These modified liquid isocyanates include allophanate-modified diphenylmethane diisocyanate, diphenylmethane diisocyanates comprising carbodiimide groups and/or uretonimine groups, and prepolymers which are the reaction product of diphenylmethane diisocyanate with a polyether polyol containing at least 80% by weight of ether units derived from propylene oxide.

In accordance with the present invention, suitable isocyanate components to be used as component (1) in the present invention include (a) allophanate modified diphenylmethane diisocyanates, (b) carbodiimide modified diphenylmethane diisocyanates, (c) uretonimine modified diphenylmethane diisocyanates, and (d) urethane modified diphenylmethane diisocyanates, as well as mixtures thereof. The liquid diphenylmethane diisocyanate adducts have an average functionality of about 2.0 to about 2.3, and an NCO content of 10 to 32% by weight.

As used herein, the term "allophanate group" refers to the following structure:

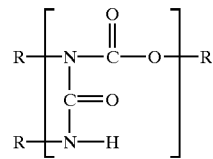

As used herein, the term "uretonimine group" refers to the following structure:

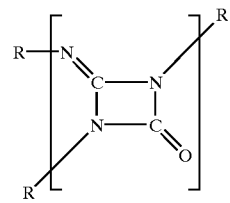

As used herein, the term "carbodiimide group" refers to the following structure:

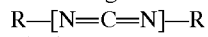

R—[N=C=N]—R

The isocyanates useful herein can be prepared by chemical modification of monomeric diphenylmethane diisocyanate (MDI). Suitable modifications include reactions with polyether polyols, diols or monoalcohols to form urethane and/or allophanate containing liquid MDI-derivatives or special catalysts to react isocyanate groups with themselves to form carbodiimide and/or uretonimine containing liquid MDI-derivatives.

Suitable isocyanates are liquid MDI-derivatives containing carbodiimide groups of the type described in U.S. Pat. No. 3,152,162, the disclosure of which is herein incorporated by reference; liquid MDI-derivatives containing urethane groups of the type described, for example, in U.S. Pat. Nos. 3,394,164 and 3,644,457, the disclosures of which are herein incorporated by reference; liquid MDI-derivatives containing allophanate groups of the type described, for example, in British Patent 994,890, Belgian Patent 761,616, and published Dutch Patent Application 7,102,524, the disclosures of which are herein incorporated by reference.

It is also possible to use mixtures of the polyisocyanates described above.

In accordance with the present invention, at least a portion of the liquid diisocyanate component is preferably present in the form of a liquid diisocyanate adduct, such as a liquid diphenylmethane diisocyanate adduct containing allophanate groups, a liquid diphenylmethane diisocyanate adduct containing carbodiimide groups, a liquid diphenylmethane diisocyanate adduct containing uretonimine groups, or a liquid diphenylmethane diisocyanate adduct containing urethane groups. Suitable adducts include the following type of components:

Allophanate group-containing diphenylmethane diisocyanates include, for example, those prepared according to the processes disclosed in U.S. Pat. Nos. 3,769,318, 4,160,080, 4,177,342, 4,810,820, 5,319,053, 5,319,054, 5,440,003, 5,606,001, 5,663,272, 5,672,736, 5,859,163, 5,917,083, the disclosures of which are herein incorporated by reference. Preferred allophanate modified polyisocyanates for the present invention have an NCO group content of from about 15 to 32%, and preferably from about 20 to 29%.

Carbodiimide group-containing and uretone imine group-containing diphenylmethane diisocyanates for the present invention include, for example, those which may be prepared by oligomerizing diphenylmethane diisocyanates in the presence of known carbodiimidization catalysts such as described in, for example, German Patentschrift 1,092,007, herein incorporated by reference, U.S. Pat. Nos. 2,853,473, 3,152,162, and 5,202,358, the disclosures of which are herein incorporated by reference, and German Offenlegungschriften 2,504,400, 2,537,685 and 2,552,350, the disclosures of which are herein incorporated by reference.

Suitable prepolymers of diphenylmethane diisocyanate to be used as component (1)(d) in the present invention include those liquid prepolymers which are the reaction product of diphenylmethane diisocyanate having an NCO group content of 10 to 25% and a viscosity of 50 to 5,000 mPa·s at 25° C., with a polyether polyol containing at least 80% by weight of ether units derived from propylene oxide. It is preferred that these diphenylmethane diisocyanates comprise from 0 to 55% of the 2,4'-isomer (preferably 1 to 10%), from 0 to 2% of the 2,2'-isomer (preferably 0 to 1%) and from 45 to 99% of the 4,4'-isomer (preferably from 90 to 99%), with the sum of the 2,2'-, the 2,4'- and the 4,4'-isomers totaling 100% by weight of the diphenylmethane diisocyanates. Suitable polyether polyols for the preparation of the prepolymers have molecular weights of from 200 to 8,000 (preferably 240 to 4,000), functionalities of from 2 to 6 (preferably 2 to 4), and OH numbers of from 37 to 1,100 (preferably 56 to 700). It is most preferred that the polyether polyols 100% of ether units derived from propylene oxide.

Suitable polyether polyols for use in the preparation of liquid MDI prepolymers containing urethane groups include polyethers prepared, for example, by the polymerization of epoxides such as ethylene oxide, propylene oxide, butylene oxide, tetrahydrofuran, styrene oxide, or epichlorohydrin, optionally in the presence of Lewis acids such as $BF_3$, or prepared by chemical addition of such epoxides, optionally added as mixtures or in sequence, to starting components containing reactive hydrogen atoms, such as water, alcohols, or amines. Examples of starting components include ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Offenlegungschriften 1,176,358 and 1,064,938 may also be used according to the invention. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyether polyols include polyoxyalkylene polyether polyols, such as polyoxypropylene diol, polyoxybutylene diol, and polyoxytetramethylene diol.

Other suitable polyether polyols for use in the preparation of liquid MDI adducts containing urethane groups include the so-called PHD polyols, which are prepared by reactions of organic polyisocyanates, hydrazine, and polyether polyols. U.S. Pat. No. 3,325,421 discloses a method for producing suitable PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835.

Suitable polyether polyols for use in the preparation of liquid MDI adducts containing urethane groups also include the so-called polymer polyols, which are prepared by polymerizing styrene and acrylonitrile- in the presence of a polyether. See, for example, U.S. Pat. Nos. 3,383,351, 3,304,273, 3,523,093, 3,652,639, 3,823,201 and 4,390,645.

Most preferred polyethers are polyoxypropylene polyethers that do not contain ethylene glycol units.

Suitable polyether polyols to be used as component (2)(a) in the present invention include those polyether polyols having a functionality of about 2 to about 4, preferably about 3, a (number average) molecular weight of 200 to about 8,000, preferably between 240 and 4,000 and most preferably about 450 to 500 and a hydroxyl number of 14 to 1,120, preferably of about 42 to about 700, and most preferably about 336 to about 374, wherein the starter for the polyether polyol contains at least one amine group, and the starter is alkoxylated with 100% by weight of propylene oxide. Suitable starters for these polyether polyols include, for example, those amine group containing compounds wherein the amine groups are aliphatic, cycloaliphatic and aromatic amine groups, preferably diamines or triamines, and more preferably aliphatic, cycloaliphatic and aromatic diamines having primary or secondary amine groups. Aromatic diamines typically contain exclusively aromatically bound primary or secondary amino groups. Some examples of suitable starter compounds include compounds such as ethylenediamine, toluene diamine, triethanolamine, diethanolamine, monoethanolamine, diphenylmethane diamine, 2,4-diaminomesitylene, 1,3,5-triethyl-2,4-diaminobenzene, 1,3,5-triisopropyl-2,4-diaminobenzene, 1-methyl-2,4-diethyl-2,4-diaminomesitylene, 1-methyl-2,6-diaminomesitylene, 4,6-dimethyl-2,-ethyl-1,3-diaminobenzene, 3,5,3',5'-tetraethyl4,4-diaminodiphenylmethane, 3,5,3',5'-tetraisopropyl4,4'-diaminodiphenylmethane, 3,5-diethyl-3',5'-diisopropyl-4,4'-diaminodiphenylmethane, 1,4-diaminobenzene, 2,4-diaminotoluene, 2,4'- and/or 4,4'-diaminodiphenylmethane, 3,3'-dimethyl-4,4'-diaminodiphenylmethane, 4,4'-diaminodiphenyl propane (-2,2), t-butyl toluene diamine, 1-methyl-3,5-bis-(methylthio)-2,4- and/or 2,6-diaminobenzene, and mixtures thereof. Preferred compounds include triethanolamine, diethanolamine, monoethanolamine, and diethyl toluene diamines such as, for example, 1-methyl-3,5-diethyl-2,4-diaminobenzene, 1-methyl-3,5-diethyl-2,6-diaminobenzene, and mixtures thereof.

Suitable low unsaturation polyether polyols to be used as component (2)(b) in the present invention include those polyether polyols wherein the unsaturation is preferably less than 0.01 meq/g, most preferably less than 0.008 meq/g, and having an OH functionality of about 2, a molecular weight of about 250 to about 8,000, preferably from about 500 to about 3,000 and most preferably about 1,000 to about 2,000, and a hydroxyl number of about 14 to about 448, preferably about 37 to about 224 and most preferably about 56 to about 112, wherein the starter comprises water or an organic compound with at least two hydroxyl groups and the starter is alkoxylated with 100% by weight of propylene oxide. Suitable starters for these low unsaturation polyether polyols include, for example, water, ethylene glycol, propylene glycol, dipropylene glycol, butylene glycol, 1,6-hexanediol, dimethylol cyclohexane, etc. Low unsaturation polyether polyols are known and described in, for example, U.S. Pat. Nos. 5,576,382, 5,670,601, 5,677,413, 5,689,012, 5,700,847, and 5,763,642, the disclosures of which are herein incorporated by reference, details, and suitable catalysts and processes for the preparation of these low unsaturation polyether polyols are described in, U.S. Pat. Nos. 5,470,813 and 5,482,908, the disclosures of which are herein incorporated by reference.

The unsaturation of the polyether polyol may be measured by titration in accordance with ASTM D 2849-69, "TESTING URETHANE FOAM RAW MATERIALS", and is expressed as milliequivalents of unsaturation per gram of polyol, or "meq/g".

Suitable isocyanate-reactive components to be used as component (2)(c) in the present invention include, for example, one or more polyether polyols having an OH functionality of about 3 to about 6 (preferably about 3 to about 4), a molecular weight of about 400 to about 3,000 (preferably about 500 to about 1,000 and most preferably about 600 to about 800), and a hydroxyl number of about 56 to about 840 (preferably about 168 to about 448, and most preferably about 210 to about 373), wherein the starter comprises an organic compound with at least three hydroxyl groups and the starter is alkoxylated with 100% by weight of propylene oxide. It is preferred that these organic compounds used as starters are free of amine groups. Suitable starters for these compounds include, for example, glycerol, trimethylolpropane, pentaerythritol, sorbitol, sucrose, etc.

Suitable isocyanate-reactive components to be used as component (2)(d) in the present invention include low molecular weight diols and triols, specifically those diols and triols having an equivalent weight of from 31 to 99. Some examples of suitable diols and triols to be used as component (2)(d) in the present invention include compounds such as glycerol, 2-methyl-1,3-propanediol, ethylene glycol, 1,2- and 1,3-propanediol, 1,3- and 1,4- and 2,3-butane-diol, 1,6-hexane-diol, 1,10-decanediol, diethylene glycol, triethylene glycol, tetraethylene glycol, dipropylene glycol, tripropylene glycol, neopentyl glycol, cyclohexane-dimethanol, 2,2,4-trimethylpentane-1,3-diol, 1,4-ethoxy(β-hydroxybenzene), and mixtures thereof. Preferred diols include, for example, 1,4-butanediol, ethylene glycol, diethylene glycol, trimethylol propane, 1,4-ethoxy (β-hydroxy-benzene), and mixtures thereof.

Suitable fillers for the present invention include those fillers having a density of less than 1 g/cm$^3$, preferably less than 0.7 g/cm$^3$, and most preferably from 0.2 to 0.5 g/cm$^3$. Suitable fillers include glass hollow spheres, hollow thermoplastic spheres composed of acrylic type resins such as polymethylmethacrylate, acrylic modified styrene, polyvinylidene chloride or copolymers of styrene and methyl methacrylate; phenolic resins; silica, ceramic or carbon spheres that are very light in weight and act as a lightweight filler in the syntactic foam. Some commercially available microspheres include Expancel 551 DE, which is available from Expancel Inc.; Z-Light W-1000 from Zeelan Industries; Dualite M6032AE which is from Pierce & Stevens Corporation; Scotchlite S-series, which is from 3-M; and QCEL 300 and QCEL 650, which are available from the PQ Corporation. The Expancel and Dualite type microspheres are both expandable and hollow microspheres consisting of a thin shell of a copolymer of vinyl chloride, vinylidene chloride, and/or acrylonitrile, the shell of the Z-Light W-1000 microsphere is ceramic and the Scotchlite and QCEL microspheres consisting of glass shells. The interior of the Expancel and Pierce & Stevens microspheres typically contain a volatile hydrocarbon, which is typically isobutane, isopentane or cyclopentane, but also could be made with custom low boiling solvents, if necessary. The ceramic and glass microspheres usually contain air, but may contain vacuum. It is preferred to use glass hollow microspheres in the present invention.

Methods for the production of these hollow microspheres are well known in the art.

The reaction mixture also contains a catalyst (4) for catalyzing the reaction between isocyanate groups and hydroxyl groups (i.e., a urethane catalyst). Such catalysts are well known in the art. Furthermore, the composition should not contain a catalyst which would catalyze the reaction between an isocyanate group and water. Suitable catalysts for the present invention are organo-metal compounds. Preferred catalysts are organic tin compounds. The organic tin compounds used preferably include tin(II) salts of carboxylic acids such as, for example, tin(II) acetate, tin(II) octoate, tin(II) ethyl hexoate and tin(II) laurate, and tin(IV) compounds such as dibutyl tin oxide, dibutyl tin dichloride, dibutyl tin diacetate, dibutyl tin dilaurate, dibutyl tin dimaleate, dioctyl tin diacetate and the like. Preferred compounds to be used as catalysts in the present invention include compounds such as dimethyltin dilaurate, dibutyltin dilaurate, dimethyltin diacetate, dibutyltin diacetate, dimethyltin dimaleate, dibutyltin dimaleate.

As used herein, the term molecular weight refers to number average molecular weight.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Isocyanate A: polymethylene poly (phenylisocyanate) having (Comparison) an NCO content of about 31.5%, a functionality of 2.8 and a viscosity at 25° C. of 200 mPa·s.

Isocyanate B: an allophanate modified isocyanate having a functionality of about 2, an NCO group content of about 23%, and a viscosity between about 400 and 650 mPa·s. This isocyanate was stable for at least 30 days at temperatures of 5° C. or greater. This isocyanate was prepared by charging (a) 100 parts (pbw) of diphenylmethane diisocyanate comprising more than about 98% by weight of the 4,4'-isomer and less than about 2% of the 2,4'-isomer, and (b) 7.76 parts of 2-methyl-1-propanol, to a stirred reactor, and heating to 600C. Then, 0.01 part of zinc acetylacetonate was added, and the stirred reaction mixture was heated to 90° C. After one hour at 90° C. the NCO group content was about 23%. The reaction mixture was cooled to 60° C. and 0.025 part of benzoyl chloride was added. The reaction mixture was then cooled to 25° C.

Polyol A: a monoethanolamine started propylene oxide polyether polyol, having an OH number of about 350, a functionality of about 3 and a number average molecular weight of about 480.

Polyol B: a glycerin started propylene oxide polyether polyol, having an OH number of about 250, a functionality of about 3 and a number average molecular weight of about 670.

Polyol C: a propylene glycol started propylene oxide having an OH number of 56, a functionality of about 2 and a molecular weight of about 2000, and no more than about 0.007 meq/g unsaturation.

Catalyst A: dimethyltin dilaurate, commercially available as Fomrez UL-28 from Witco.

Glass Bubbles: Scotchlite-38 glass bubbles having a density of 0.38 g/cc, commercially available from 3M.

The following polyol blend was used in the examples:

Polyol Blend I: 10 pbw Polyol A 45 pbw Polyol B 45 pbw Polyol C 0.01 pbw Catalyst A The polyurethane castings in Examples 1 to 6 were prepared according to the following procedure.

The different isocyanates were hand mixed with 200 g of Polyol Blend I containing between 30 and 50% glass hollow spheres (3M Scotchlite glass bubbles(S-38) 0.38 g/cc) at an NCO:OH equivalent ratio of 1.05:1.00 at 25–30° C. for about 2 minutes. The ratios by weight are given in Table 1. The mixture was then poured into a mold (6 in.×6 in.×0.125 in.) that was pre-heated to 60° C., and the samples were allowed to cure at room temperature for 16 hours before demolding. The samples were stored for at least 1 week at room temperature in a temperature and humidity controlled environment, and then tested for various physical and mechanical properties. The results are shown in Table 2.

TABLE 1

| | Composition of Examples 1–6: | | | | | |
|---|---|---|---|---|---|---|
| Example | 1 | 2 | 3 | 4 | 5 | 6 |
| Polyol Blend I* | 200 | 200 | 200 | 200 | 200 | 200 |
| Iso A* | 85.4 | 85.4 | 85.4 | | | |
| Iso B* | | | | 108 | 108 | 108 |
| Glass Bubbles* | 60 | 80 | 100 | 60 | 80 | 100 |
| Catalyst A | 0.003 | 0.003 | 0.003 | 0.003 | 0.003 | 0.003 |
| Gel time (mins) | 3:30 | 3:30 | 3:30 | 3:15 | 3:15 | 3:15 |
| Demolding time (mins) | 8:00 | 8:00 | 8:00 | 7:00 | 7:00 | 7:00 |

All parts for Polyol Blend I, Iso A, Iso B, Glass Bubbles and Catalyst A in Table 1 are given in grams.
*All materials in Examples 1–6 were at 40° C..
All mold temperatures for Examples 1–6 were 60° C..

| Gel vs. Demolding Times at Different Catalyst Levels* | | | | | | |
|---|---|---|---|---|---|---|
| Isocyanate B (g) | 59 | 59 | 59 | 59 | 59 | 59 |
| Polyol Blend I (g) | 100 | 100 | 100 | 100 | 100 | 100 |
| Glass Bubbles (g) | 30 | 30 | 30 | 30 | 30 | 30 |
| Catalyst A | 0.0 | 0.001 | 0.015 | 0.02 | 0.05 | 0.1 |
| Gel Time (mins) | 24 hrs** | 5 hrs** | 3:15 | 2:30 | 1:00 | Gelled while mixing |
| Demolding Time (mins) | Not possible | 24 hrs | 7:00 | 6:30 | 2:00 | N.A |

*all raw materials and molds were maintained at ambient temperature (i.e. 22° C.)
**surface bubbles These experiments clearly indicate that a minimum amount of organo metal catalyst is required to obtain a desirable relation between gel time and demolding time.

In Table 2, Examples 4, 5 and 6, which are representative of the present invention, show considerably lower water absorption as measured by % gain in weight after storage under water. Also, at about the same hardness and density as Examples 1, 2 and 3, respectively, the physical properties of Examples 4, 5 and 6 are substantially improved.

TABLE 2

Physical testing Results
Water Absorption

| Example | | 1 | 2 | 3 | 4 | 5 | 6 |
|---|---|---|---|---|---|---|---|
| Salt Water Testing | | | | | | | |
| RT/24 hrs. | % gain | 1.20 | 1.51 | 1.37 | 0.93 | 1.15 | 1.28 |
| 50C/24 hrs. | % gain | 1.18 | 1.06 | 1.30 | 1.12 | 1.34 | 1.46 |
| RT/168 hrs. | % gain | 2.43 | 2.96 | 2.72 | 1.98 | 1.97 | 2.11 |
| 50C/168 hrs. | % gain | 2.45 | 2.64 | 3.17 | 1.97 | 2.19 | 2.22 |
| Fresh Water Testing | | | | | | | |
| RT/24 hrs. | % gain | 0.31 | 0.34 | 0.40 | 0.20 | 0.19 | 0.27 |
| RT/168 hrs. | % gain | 1.06 | 1.28 | 1.36 | 0.66 | 0.65 | 1.02 |
| Tensile Properties | Tensile strength (psi) | 981 | 1154 | 1264 | 1534 | 1615 | 1750 |
| | % elongation | 31 | 21 | 13 | 48 | 46 | 45 |
| Split Tear | pli | 34 | 26 | 20 | 105 | 81 | 101 |
| Die "C" Tear | pli | 179 | 244 | 168 | 327 | 328 | 355 |
| Shore A | 5 sec. | 94 | 98 | 97 | 96 | 96 | 97 |
| Shore D | 5 sec. | 35 | 53 | 45 | 50 | 50 | 50 |
| Taber Abrasion | Wt loss (mg) | 2402 | 2786 | 3551 | 652 | 1270 | 1147 |
| Rebound | % | 22 | 44 | 30 | 45 | 40 | 36 |
| Density | lb/ft3 | 50 | 48 | 45 | 50 | 48 | 46 |

At about the same hardness and density, the use of liquid diphenylmethane diisocyanate vs. polymeric MDI, combined with the use of low unsaturation difunctional polyethers results in syntactic foams which have the following advantages:

much higher tensile strength and elongation (about 50%).
much higher tear strength (on the average 3 times higher).
much lower Taber abrasion (30 to 50%).
considerably lower water absorption (25 to 50% in fresh water, and 20 to 30% in salt water).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A syntactic foam comprising the reaction product of:
   (1) a liquid diphenylmethane diisocyanate having an NCO group content of from about 10 to about 33.6% and a viscosity from about 10 to about 5,000 mPa·s @ 25° C., with
   (2) an isocyanate-reactive component comprising:
      (a) at least 10% by weight of one or more polyether polyols having a functionality of 2 to 4, a molecular weight of 200 to 8,000, and a hydroxyl number of 14 to 1,120, wherein at least one amine group is present in the starter for said polyether polyol, and the starter being alkoxylated by 100% by weight of propylene oxide;
      (b) at least 20% by weight of one or more low unsaturation polyether polyols having an OH functionality of about 2, a molecular weight of 250 to 8,000, and a hydroxyl number of 14 to 448, wherein the starter for said low unsaturation polyether polyol comprises water or an organic component containing two hydroxyl groups, and the starter being alkoxylated with 100% by weight of propylene oxide;
      (c) at least 20% by weight of one or more polyether polyols having an OH functionality of about 3 to 6, a molecular weight of about 400 to about 3,000, and an hydroxyl number of about 56 to about 840, wherein the starter for said polyether polyol comprises an organic compound containing at least three hydroxyl groups, and the starter being alkoxylated with 100% by weight of propylene oxide; and, optionally,
      (d) up to 10% by weight of one or more low molecular weight diols and/or triols having an equivalent weight of from 31 to 99;
   wherein the %'s by weight of (2)(a), (2)(b), (2)(c) and (2)(d) totals 100% by weight of component (2);
   (3) from 10 to 70% by weight, based on the combined weight of components (1), (2) and (3), of a filler having a density of less than 1 g/cm$^3$; and
   (4) at least one organo-metallic catalyst in the amount of about 0.001 to about 1% by weight, based on 100% by weight of (2);
   wherein the relative amounts of components (1) and (2) are such that the isocyanate index is from about 90 to about 120.

2. The syntactic foam of claim 1, wherein (1) said liquid diphenylmethane diisocyanate comprises up to 70% by weight of 2,4'-diphenylmethane diisocyanate, no more than 2% by weight of 2,2'-diphenylmethane diisocyanate, and the balance being 4,4'-diphenylmethane diisocyanate, such that the sum of the 2,4'-MDI, the 2,2'-MDI and the 4,4'-MDI totals 100% by weight of the liquid diphenylmethane diisocyanate.

3. The syntactic foam of claim 2, wherein (1) said liquid diphenylmethane diisocyanate comprises less than 10% by weight of 2,4'-diphenylmethane diisocyanate.

4. The syntactic foam of claim 1, wherein (1) said liquid diphenylmethane diisocyanate comprises allophanate modified diphenylmethane diisocyanate.

5. The syntactic foam of claim 1, wherein (1) the liquid diphenylmethane diisocyanate comprises carbodiimide groups and/or uretonimine groups.

6. The syntactic foam of claim 2, wherein (1) the liquid diphenylmethane diisocyanate comprises the reaction product of diphenylmethane diisocyanate with a polyether polyol containing at least 80% by weight of ether units derived from propylene oxide.

7. The syntactic foam of claim 6, wherein the polyether polyol comprises dipropylene glycol, tripropylene glycol or mixtures thereof.

8. The syntactic foam of claim 1, wherein (2) said isocyanate-reactive component comprises
   (a) from 10 to 30% by weight of one or more polyether polyols having a functionality of about 3, a molecular weight of between about 240 and 4,000, and a hydroxyl number of about 42 to about 700;
   (b) from about 30 to about 80% by weight of one or more low unsaturation polyether polyols having an OH functionality of about 2, a molecular weight of from about 500 to about 3,000 and a hydroxyl number of about 37 to about 224; and
   (c) from about 30 to about 80% by weight of one or more polyether polyols having an OH functionality of about 3 to about 4, a molecular weight of about 500 to about 1,000 and an OH number of about 168 to about 448.

9. A process for preparing a syntactic foam, comprising reacting:
   (1) a liquid diphenylmethane diisocyanate having an NCO group content of from about 10 to about 33.6% and a viscosity from about to about 5,000 mPa·s @ 25° C., with
   (2) an isocyanate-reactive component comprising:
      (a) at least 10% by weight of one or more polyether polyols having a functionality of 2 to 4, a molecular weight of 200 to 8,000, and a hydroxyl number of 14 to 1,120, wherein at least one amine group is present in the starter for said polyether polyol, and the starter being alkoxylated by 100% by weight of propylene oxide;
      (b) at least 20% by weight of one or more low unsaturation polyether polyols having an OH functionality of about 2, a molecular weight of 250 to 8,000, and a hydroxyl number of about 14 to 448, wherein the starter for said low unsaturation polyether polyol comprises water or an organic component containing two hydroxyl groups, and the starter being alkoxylated with 100% by weight of propylene oxide;
      (c) at least 20% by weight of one or more polyether polyols having an OH functionality of about 3 to 6, a molecular weight of about 400 to about 3,000, and an hydroxyl number of about 56 to about 840, wherein the starter for said polyether polyol comprises an organic compound containing at least three hydroxyl groups, and the starter being alkoxylated with 100% by weight of propylene oxide; and, optionally,
      (d) up to 10% by weight of one or more low molecular weight diols and/or triols having an equivalent weight of from 31 to 99;
   wherein the %'s by weight of (2)(a), (2)(b), (2)(c) and (2)(d) totals 100% by weight of component (2);
   (3) from 10 to 70% by weight, based on the combined weight of components (1), (2) and (3), of a filler having a density of less than 1 g/cm$^3$; and
   (4) at least one organo-metallic catalyst in the amount of about 0.001 to about 1% by weight, based on 100% by weight of component (2);
   wherein the relative amounts of components (1) and (2) are such that the isocyanate index is from about 90 to about 120.

10. The process of claim 9, wherein (1) said liquid diphenylmethane diisocyanate comprises up to 70% by weight of 2,4'-diphenylmethane diisocyanate, no more than 2% by weight of 2,2'-diphenylmethane diisocyanate, and the balance being 4,4'-diphenylmethane diisocyanate, such that the sum of the 2,4'-MDI, the 2,2'-MDI and the 4,4'-MDI totals 100% by weight of the liquid diphenylmethane diisocyanate.

11. The process of claim 10, wherein (1) said liquid diphenylmethane diisocyanate comprises less than 10% by weight of 2,4'-diphenylmethane diisocyanate.

12. The process of claim 9, wherein (1) said liquid diphenylmethane diisocyanate comprises allophanate modified diphenylmethane diisocyanate.

13. The process of claim 9, wherein (1) the liquid diphenylmethane diisocyanate comprises carbodiimide groups and/or uretonimine groups.

14. The process of claim 10, wherein (1) the liquid diphenylmethane diisocyanate comprises the reaction product of diphenylmethane diisocyanate with a polyether polyol containing at least 80% by weight of ether units derived from propylene oxide.

15. The process of claim 14, wherein the polyether polyol comprises dipropylene glycol, tripropylene glycol or mixtures thereof.

16. The process of claim 9, wherein (2) said isocyanate-reactive component comprises
   (a) from 10 to 30% by weight of one or more polyether polyols having a functionality of about 3, a molecular weight of between about 240 and 4,000, and a hydroxyl number of about 42 to about 700;
   (b) from about 30 to about 80% by weight of one or more low unsaturation polyether polyols having an OH functionality of about 2, a molecular weight of from about 500 to about 3,000 and a hydroxyl number of about 37 to about 224; and
   (c) from about 30 to about 80% by weight of one or more polyether polyols having an OH functionality of about 3 to about 4, a molecular weight of about 500 to about 1,000 and an OH number of about 168 to about 448.

17. A process for preparing a pipe insulated with a syntactic foam, comprising:
   (I) placing a steel pipe in the center of a cylindrical mold with the diameter of the mold being larger than the diameter of the pipe, wherein the difference in diameter between the pipe and the mold determines the thickness of the syntactic foam to be applied;
   (II) pouring a liquid polyurethane reaction mixture containing a filler around the steel pipe in the mold, wherein said liquid polyurethane reaction mixture is formed by:
      (A) blending (3) a filler having a density of less than 1 g/cm$^3$ with (1) a liquid diisocyanate component and/or (2) an isocyanate-reactive component,
      (B) adding (4) an organo-metallic catalyst to the isocyanate-reactive component which may or may not contain a filler; and
      (C) mixing the liquid diisocyanate component with the isocyanate-reactive component, wherein:
         (1) said liquid diisocyanate component comprises liquid diphenylmethane diisocyanate having an NCO group content of from about 10 to about 33.6% and a viscosity from about 10 to about 5,000 mPa·s @ 25° C., with
         (2) an isocyanate-reactive component comprising:
            (a) at least 10% by weight of one or more polyether polyols having a functionality of 2 to 4, a molecular weight of 200 to 8,000, and a hydroxyl number of 14 to 1,120, wherein the starter for said polyether polyol comprises at least one amine group, and said starter being alkoxylated by 100% by weight of propylene oxide;

(b) at least 50% by weight of one or more low unsaturation polyether polyols having an OH functionality of about 2, a molecular weight of 250 to 8,000, and a hydroxyl number of 14 to 448, wherein the starter comprises water or an organic component containing at least two hydroxyl groups, and said starter being alkoxylated with 100% by weight of propylene oxide;

(c) at least 20% by weight of one or more polyether polyols having an OH functionality of about 3 to about 6, a molecular weight of about 400 to about 3,000, and an hydroxyl number of about 56 to about 840, wherein the starter for said polyether polyol comprises an organic compound containing at least three hydroxyl groups, and said starter being alkoxylated with 100% by weight of propylene oxide; and, optionally, (d) up to 10% by weight of one or more low molecular weight diols and/or triols having an equivalent weight of from 31 to 99, wherein the %'s by weight of (2)(a), (2)(b), (2)(c) and (2)(d) totals 100% by weight of component (2);

(III) allowing the liquid polyurethane reaction mixture containing the filler cure to form a solid polyurethane containing a filler, which encapsulates the steel pipe; and (IV) demolding the polyurethane encapsulated steel pipe, thereby yielding a syntactic foam insulated pipe.

18. A syntactic foam insulated pipe produced by the process of claim 17.

* * * * *